US007787420B2

(12) United States Patent
Räsänen et al.

(10) Patent No.: US 7,787,420 B2
(45) Date of Patent: Aug. 31, 2010

(54) PROTOCOL PARAMETER RE-NEGOTIATION AFTER CERTAIN TYPES OF NON-TRANSPARENT DATA CALL HANDOVERS (75) Inventors: Juha Räsänen, Espoo (FI); Jukka Ala-Vannesluoma, Tampere (FI)

(73) Assignee: Nokia Corporation, Espoo (FI)

( * ) Notice: Subject to any disclaimer, the term of this patent is extended or adjusted under 35 U.S.C. 154(b) by 1141 days.

(21) Appl. No.: 10/826,882

(22) Filed: Apr. 16, 2004

(65) Prior Publication Data
US 2004/0264411 A1 Dec. 30, 2004

(30) Foreign Application Priority Data
Apr. 17, 2003 (WO) .................. PCT/IB03/01443

(51) Int. Cl.
H04W 4/00 (2009.01)
H04M 1/00 (2006.01)
(52) U.S. Cl. .............. 370/331; 370/342; 370/329; 455/552.1; 455/426.1; 455/436
(58) Field of Classification Search .......... 455/452.1, 455/432.1–444, 552.1, 553.1, 450–453, 426.1; 370/329–334
See application file for complete search history.

(56) References Cited
U.S. PATENT DOCUMENTS
6,181,940 B1 * 1/2001 Rune ................. 455/435.2
6,621,809 B1 * 9/2003 Lee et al. .............. 370/335
2001/0030954 A1 * 10/2001 Hameleers et al. ........ 370/338
2002/0015392 A1 * 2/2002 Musikka et al. .......... 370/331

FOREIGN PATENT DOCUMENTS

| WO | WO 00/44189 | * | 7/2000 |
| WO | WO 01/39525 |   | 5/2001 |
| WO | WO 01/65881 | * | 9/2001 |
| WO | WO 02/25888 | * | 3/2002 |
| WO | WO 02/054820 |  | 7/2002 |
| WO | WO 03/065654 |  | 8/2003 |

OTHER PUBLICATIONS

3GPP, TS 24.022, version 5.1.0, Release 5, p. 14, 21, Table 1.*

(Continued)

Primary Examiner—Lester Kincaid
Assistant Examiner—Daniel Lai
(74) Attorney, Agent, or Firm—Alfred A. Fressola; Ware, Fressola, Van Der Sluys & Adolphson LLP (57) ABSTRACT The invention relates to a method and a computer program product for negotiation of a parameter for a protocol that controls data transmission between first Communication Units (CUs) and third CUs via second CUs. An improved protocol parameter adaptation for certain non-transparent data call handovers is achieved by proposing that when an existing association of said first CU with a former second CU is changed to an association of said first CU with a new second CU, protocol entities of the first CU and protocol entities of the third CU associated with the new second CU exchange at least one negotiation message containing a value for said parameter. The invention further relates to a system for data transmission.

23 Claims, 5 Drawing Sheets

OTHER PUBLICATIONS http://www.webopedia.com/TERM/U/UMTS.html.*

3GPP TS 24.008 verision 3.11.0 Release 1999, published Mar. 2002, p. 194-195.*

$3^{rd}$ Generation Partnership Project, Technical Specification Group Core Network, "Radio Link Protocol (RLP) for Circuit Switched Bearer and Teleservices," Release 5, 3GPP TS 24.022, version 5.1.0 (Dec. 2002).

* cited by examiner

PROTOCOL PARAMETER RE-NEGOTIATION AFTER CERTAIN TYPES OF NON-TRANSPARENT DATA CALL HANDOVERS

CROSS REFERENCE TO RELATED APPLICATIONS

The present application claims priority under 35 USC §119 to International Patent Application No. PCT/IB03/01443 filed on Apr. 17, 2003.

TECHNICAL FIELD

The invention relates to a method for negotiation or re-negotiation of a parameter or parameters for use in the operation of a protocol that controls data transmission between first Communication Units (CUs) and third CUs via second CUs, where the protocol is operated by protocol entities in the first and third CUs, where a first CU is always associated with a second CU at a time, where a second CU is always associated with a third CU at a time, and where there exist second CUs of at least a first and second type and/or third CUs of at least a first and second type that require different choices of said parameter.

BACKGROUND OF THE INVENTION

In mobile radio systems of the second and third generation, such as the Global System for Mobile Communications (GSM) and the Universal Mobile Telecommunications System (UMTS), Non-Transparent (NT) data bearers are provided that offer an error-free data transfer service to the user. The data transfer service is based on the Radio Link Protocol (RLP) and the Layer-2 Relay (L2R) Character Oriented Protocol (COP). The RLP function offers an Automatic Repeat Request (ARQ) protocol that extends from the mobile station (MS) to the network Interworking Functions (IWF) in the Mobile-services Switching Centre (MSC) in order to detect errors by means of a Forward Error Correction (FEC) procedure and RLP's Frame Check Sequence (FCS) for each transmitted RLP frame, where an RLP frame represents an RLP Protocol Data Unit (PDU), and to eliminate errors by repeating the transmission of the frame under exploitation of the time-variance of the transmission medium. The L2R function converts the layer-2 protocol of the MS into a COP that uses transmission protected by an RLP.

The RLP is controlled by several parameters such as acknowledgement, reply and re-sequencing timers or the number of retransmission attempts or required window sizes, that either are assigned default values or can be modified by the user or network e.g. by means of AT commands. If a change of parameters is initiated in either the MS RLP entity or the MSC RLP entity, the desired parameters are signalled to the corresponding peer RLP entity via exchange IDentification (XID) frames, which are RLP frames (PDUs) in which the information field is interpreted as exchange identification instead of data. To start negotiation, an XID command frame will be signalled. The peer entity confirms the value of each parameter by returning the value within an XID response or offering lower or higher values of the parameter in its place depending on the sense of negotiation of the parameter.

The RLP may use one physical link (single-link) or from 1 up to 4 sub-streams on one or more physical links (multi-link). The multi-link version of the RLP protocol is only applicable in GSM and not in UMTS.

Among said control parameters of the RLP protocol, the acknowledgement timer T1 associated with the transmitting RLP entity indicates the re-transmission period after which the re-transmission of a not-acknowledged frame may be started. Due to ARQ in combination with FEC, each received RLP frame is checked for correct/incorrect reception at the receiving RLP entity, and correct/incorrect reception is signalled back to the transmitting peer RLP entity. The timer T1 defines the maximum time period starting with the transmission of an RLP frame within which a correct/incorrect acknowledgement of the transmitted RLP frame is expected. An expiration of the timer T1 causes the retransmission of the frame because the acknowledgement of the sent frame was not received in time.

Among said control parameters of the RLP protocol, the timer T2 associated with the receiver indicates the maximum permissible period the receiving RLP peer entity is allowed between the reception of a frame and the transmission of the acknowledgement message.

Among said control parameters of the RLP protocol, the re-sequencing timer T4 guards the maximum difference between the delays of frames transmitted on different physical links within the multi-link RLP protocol. The timer T4 defines how great the variation of the transmission delay of all physical links can be. If received frames are out of sequence, the receiver waits for the duration of timer T4 for the missing frames before starting any recovery actions. Concluding, in multi-link operation (e.g. GSM), $T1>T2+T4+2*TD$ has to hold, were TD is the transmission delay between MS and MSC, whereas in single-link transmission (e.g. UMTS), $T1>T2+2*TD$ has to hold.

In both GSM and UMTS, the transmission of the PDUs/frames of the RLP is performed by lower layers of the protocol stack. The delay characteristics of the RLP frames are thus at least dependent on the delay characteristics of the physical layer, i.e. the lowest layer in the protocol stack. When considering the transmission of RLP PDUs from an MS RLP entity to an MSC RLP entity in GSM, in the physical layer the transmission paths between the MS and the Base Transceiver Station (BTS), between the BTS and the Base Station Controller (BSC) and between the BSC and the MSC have to be taken into account. In UMTS, basically the same propagation paths are encountered, where the MS corresponds to the User Equipment (UE), the BTS corresponds to the Node B and the BSC corresponds to the Radio Network Controller (RNC). In the sequel, GSM notation will be used to identify the components of both mobile radio systems.

The BTS-BSC and BSC-MSC interfaces are usually realised by lower-delay connections such as Time Division Multiplex (TDM) connections (e.g. ISDN primary rate). However, also higher-delay connections such as Internet Protocol (IP), e.g. in a Distributed Radio Access Network (DRAN) environment or in an IP-based GSM Intranet Office (GIO) environment, or satellite connections may be applicable. It is easily understood that depending on the delay characteristics of the BTS-BSC or BSC-MSC connection, especially the timers T1 and T4 of the RLP have to be adapted accordingly to assure proper operation of the mobile radio system.

The applicant's international patent application WO 02/25888 A2 discloses one approach for an adaptation of RLP timers. WO 02/25888 A2 sets out from the fact that, in a typical GSM physical link, the transmission delay is within a tightly bounded range so that the RLP entities will use default values for the RLP timers based on the expected characteristics of the physical link. For the case when unexpectedly large delays occur, e.g. in an IP-based GSM office environment, an XID proxy unit is proposed as an additional negotiation unit that monitors and verifies XID commands sent between the MS and MSC entities. The XID proxy has knowledge of the maximum delay values for the physical link between the MS and the MSC. Based on this information, it has the capacity to intervene in the process of negotiation of T1 timer values between the MS and the MSC with the aim of ensuring that the value that is settled upon is large enough to cope with transmission delays that might be beyond the expectations (the default or offered timer values) of the MS and MSC.

In this prior art approach, the XID proxy is only activated when it "sniffs" the passing of an XID negotiation message between the RLP entities of the MS and the MSC. For this to happen, it is required that a new NT data call is set up within the higher-delay network, so that standard RLP timer negotiation between the RLP entities of MS and MSC is initiated via XID frames.

However, the prior art approach fails to adapt the RLP parameters to the delay characteristics of a higher-delay network if the NT data call was set up—and thus parameterised with a smaller timer during the initial RLP timer negotiation—in a lower-delay network and is subsequently handed over to the higher delay network, where no re-negotiation of the RLP timers takes place and thus the XID proxy is not activated. Such a situation occurs if a MS is associated with a first BTS that is connected to its MSC via TDM, and then is handed over to a BTS that is connected to its MSC via IP (where both MSCs can well be the same).

A similar problem arises when a hand-over of a UMTS-based NT data call to a GSM-based call occurs and RLP parameters that are essential in the GSM system, but not essential in the UMTS system, e.g. the RLP timer T4, are not negotiated or re-negotiated upon entry in the GSM system, so that default values are used in the GSM system instead of using values that have been adapted or selected for particular use in the GSM system.

SUMMARY OF THE INVENTION

In view of the above-mentioned problems, it is thus the object of the present invention to provide a method for improved protocol parameter adaptation for certain types of non-transparent data call handovers.

To solve the object of the invention, it is proposed that a method for negotiation or re-negotiation of a parameter for use in the operation of a protocol that controls data transmission between first Communication Units (CUs) and third CUs via second CUs, where the protocol is operated by protocol entities in the first and third CUs, where a first CU is always associated with a second CU at a time, where a second CU is always associated with a third CU at a time, and where there exist second CUs of at least a first and second type and/or third CUs of at least a first and second type that require different choices of said parameter, is characterised in that when an existing association of said first CU with a former second CU is changed to an association of said first CU with a new second CU, said protocol entities of the first CU and said protocol entities of the third CU associated with the new second CU exchange at least one negotiation message containing a value for said parameter. Thus when the association of the first CU to the second CU is changed, either resulting in an exchange of the type of the second CU in the chain first-second-third CU from a former second CU of a first type to a new second CU of a second type when both the former and new second CU are associated with the same third CU (of any type), or resulting in an exchange of the type of the third CU in the chain first-second-third CU when the former second CU and the new second CU are of the same type, but associated with different third CUs of a first and second type, respectively, or resulting in an exchange of the types of both the second and the third CU in the chain first-second-third CU, when the former and new second CUs of the first and second type are associated with different third CUs of a first and second type, or resulting in no exchange of the types of the second and third CUs in the chain first-second-third CU, when the former second CU is of the same type as the new second CU and if both second CUs are associated with the same type of third CU, either the protocol entity of the first or third CU are informed of the change of associations and are triggered to transmit a negotiation message to their corresponding peer entity. The negotiation message represents a proposal to change a parameter, which affects the performance of the protocol controlling the data transmission between the first and third CU via the second CU and which depends on the type of second and/or third CU used in the chain first-second-third CU. The influence of the parameter on the protocol may as well be seen in the fact that the parameter is not required, when a third CU of the first type is part of the chain first-second-third CU, but is required when the third CU of the first type is replaced by a third CU of the second type.

A first preferred embodiment of the invention is characterised in that the former second CU was associated with a third CU of a first type and the new second CU is associated with a third CU of a second type. The type of the third CU in the chain first-second-third CU thus changes from a first type to a second type. In said event of a change of the third CU from a first type to a second type, an additional change of the type of the second CU from a first type to a second type may occur or not.

According to the first preferred embodiment of the invention, it is preferred that in said exchange of at least one negotiation message, the protocol entity in the first CU performs the following steps: a first step of checking whether said parameter is required for the operation of said protocol between the protocol entities of the first CU and the third CU that is associated to the new second CU, a second step of checking whether a value for said parameter needs to be negotiated or re-negotiated, and a third step of transmitting a negotiation message containing a value for said parameter to the protocol entity of the third CU associated with the new second CU, if said first and second checking steps produced positive results. The parameter is thus only negotiated or re-negotiated within the protocol if it is required for the operation of said protocol between the protocol entities of the first CU and the third CU that is associated to the new second CU, a fact that may mainly depends on the type of third CU. Elsewhere, both protocol entities in the first and third CU use a default value for the parameter, and negotiation or re-negotiation is not necessary but may still be carried out. The initiative for parameter negotiation or re-negotiation can as well be started by the protocol entity of the third CU. Then, however, no values for the parameter as selected by the user can serve as a basis for starting the parameter negotiation/re-negotiation.

In said exchange of at least one negotiation message in the first embodiment of the invention, the protocol entity of the third CU associated with the new second CU performs the following steps: receiving the negotiation message transmitted by the protocol entity of the first CU containing a value for said parameter, and transmitting a negotiation message to the protocol entity of the first CU containing the received or a higher value for said parameter.

The first embodiment of the present invention is advantageously characterised in that said first CU is a Mobile Station (MS) of a mobile radio system, that said second CUs are Base Transceiver Stations (BTSs), and that said third CUs are Mobile-services Switching Centres (MSCs). The invention thus is for instance applicable to GSM systems and UMTS systems. In the MSCs, the protocol entities are operated by the Interworking Function (IWF).

In the physical link between BTS and MSC, furthermore a Base Station Controller (BSC) may be provided.

According to the first embodiment of the present invention, it is further preferred that said third CU of the first type is a MSC of a mobile network operated according to the UMTS standard or a derivative thereof (UMTS-MSC), and that said third CU of the second type is a MSC of a mobile network operated according to the GSM standard or a derivative thereof (GSM-MSC). With the change of an association of the MS with a former BTS that is associated with a UMTS-MSC, to an association of the MS to a new BTS that is associated with a GSM-MSC, a handover of the MS from a UMTS system to a GSM system occurs, and a negotiation or re-negotiation of parameters, which are not required for said protocol when running in the UMTS system, may be necessary to properly operate the protocol in the GSM system.

According to the first embodiment of the invention, it is preferred that said protocol is a circuit switched, non-transparent single- and/or multi-link data protocol with Automatic Repeat Request (ARQ).

According to the first embodiment of the invention, it is further preferred that said protocol is the Radio Link Protocol (RLP). Within the RLP protocol, exchange IDentification (XID) messages then can be used as negotiation messages.

Said parameter then preferably defines the value of a re-sequencing timer that guards the difference between the delays of frames transmitted on different physical links within a multi-link protocol.

Said first step of checking whether said parameter is required for the operation of said protocol between the protocol entities of the first CU and the third CU that is associated to the new second CU then comprises the step of checking whether the data transmission between the MS and the GSM-MSC is a multi-link transmission or whether there is a possibility that the single-link transmission will be upgraded to a multi-link transmission later. In single-link transmission, the re-sequencing timer is purposeless (zero) and thus does not have to be re-negotiated upon entry of the MS into the GSM cell.

Said second step of checking whether said parameter needs to be negotiated or re-negotiated comprises the step of checking whether a value for said re-sequencing timer was defined by the user of the MS.

If no value was defined by the user, default values for the re-sequencing timer as stored in the RLP entities of both the MS and GSM-MSC may be used, and no negotiation or re-negotiation was necessary.

A second preferred embodiment of the invention is characterised in that the former second CU is a second CU of a first type and the new second CU is a second CU of a second type. Thus when an association of the first CU with a former second CU changes to an association of the first CU with a new second CU, the type of the second CU in the chain first-second-third CU changes from a second CU of a first type to a second CU of a second type. Note that, depending on the association of the second CUs with their third CUs, an additional change of the type of the third CU from a first type to a second type may occur as well.

In said exchange of at least one negotiation message in the second embodiment of the invention, the protocol entity of the third CU associated with the new second CU performs the step of transmitting a negotiation message containing a value for said parameter to the protocol entity of the first CU. However, the initiation of the parameter re-negotiation may as well be started by the protocol entity of the first CU.

According to the second embodiment of the invention, it is preferred that said value for said parameter depends on the transmission characteristic of the transmission medium between the new second CU and its associated third CU and that said value can be determined by said third CU for each of the second CUs it can be associated with. This can either be achieved by measurements of the transmission characteristics that are initiated by the third CU or by a look-up table that is stored at the third CU and contains the values for each possible association of the third CU with second CUs, where the transmission characteristic of the medium between second and third CU also contains the influence of the BSC.

In said exchange of at least one negotiation message in the second embodiment, the protocol entity of the first CU preferably performs the following steps: receiving the negotiation message transmitted by the protocol entity of the third CU that is associated with the new second CU and containing a value for said parameter, and transmitting a negotiation message to the protocol entity of the third CU that is associated with the new second CU containing the same or a higher value for said parameter. Thus the value for said parameter is up-negotiated based upon a value for said parameter that is proposed by the third CU.

According to the second embodiment of the invention, it is preferred that said first CU is a Mobile Station (MS) of a mobile radio system, that said second CUs are Base Transceiver Stations (BTSs), and that said third CUs are Mobile-services Switching Centres (MSCs). The invention thus is for instance applicable to GSM systems and UMTS systems. In the MSCs, the protocol entities are operated by the Interworking Function (IWF). In the physical link between BTS and MSC, furthermore a Base Station Controller (BSC) may be provided.

According to the second embodiment of the invention, it is further preferred that one out of the first and second types of said second CU is a BTS that is connected to its associated MSC via a lower-delay network, and that the other type of said second CU is a BTS that is connected to its associated MSC via a higher-delay network. The method according to the second embodiment of the present invention aims at the re-negotiation of a parameter, which influences the performance of the protocol controlling the data transmission between MS and MSC and which is affected by a change from a BTS and related network with a lower delay to a BTS and related network with a higher delay or vice versa from a BTS and related network with a higher delay to a BTS and related network with a lower delay.

Said lower-delay network may be a Time Division Multiplex (TDM) network.

Said higher-delay network may be at least partially based on the Internet Protocol (IP) or a satellite connection. E.g. the connection between BTS and BSC may be IP-based, and the connection from the BSC to the MSC may be TDM-based.

According to the second embodiment of the invention, the MSC that is connected to its associated BTS via the lower-delay network may either be operated according to the UMTS standard, the GSM standard or a derivative thereof, and the MSC that is connected to its associated BTS via the higher-delay network may either be operated according to the UMTS standard, the GSM standard or a derivative thereof.

According to the second embodiment of the invention, it is preferred that said protocol is a circuit switched, non-transparent single- and/or multi-link data protocol with Automatic Repeat Request (ARQ).

According to the second embodiment of the invention, it is further preferred that said protocol is the Radio Link Protocol (RLP). Within the RLP protocol, exchange IDentification (XID) messages then can be used as negotiation messages.

Said parameter advantageously defines the value of an acknowledgement timer that guards the re-transmission period after which the re-transmission of a not-acknowledged frame within a protocol with ARQ may be started. This parameter extremely depends on the delay characteristics of the physical link between MS and MSC, which incorporates the link between BTS and BSC and BSC and MSC.

Said parameter further advantageously defines the value of a re-sequencing timer that guards the difference between the delays of frames transmitted on different physical links within a multi-link protocol. If the handover takes place within the GSM system or from the UMTS system into the GSM system, multi-link data transmission or single-link data transmission that may later be upgraded to multi-link transmission, e.g. within the RLP protocol, is possible, and a re-sequencing timer is required. As the acknowledgement timer, the re-sequencing timer extremely depends on the delay characteristics of the physical link between MS and MSC, which incorporates the link between new BTS and BSC and BSC and MSC.

Said transmission characteristic is preferably related to the transmission delay. The MSC then administrates a look-up table that contains the delays (or maximum delay difference in case of multi-link transmission) for each BTS that it may become associated with, and in case of a change of a lower-delay BTS to a higher-delay BTS or vice versa in the chain MS-BTS-(BSC)-MSC proposes a suited value for said acknowledgement or re-sequencing timer to the MS, where said value is taken from that look-up table.

The object of the invention is further solved by a method for negotiation of a parameter or parameters for use in the operation of a protocol that controls data transmission between first Communication Units (CUs) and third CUs via second CUs, where the protocol is operated by protocol entities in the first and third CUs, where a first CU is always associated with a second CU at a time, where a second CU is always associated with a third CU at a time, and where there exist second CUs of at least a first and second type and/or third CUs of at least a first and second type that require different choices of said parameter, which is characterised in that in the case that it is possible that an association of said first CU with a second CU that is associated with a third CU of a first type may be changed to an association of said first CU with a second CU that is associated with a third CU of a second type, said protocol entities of said first CU and said protocol entities of said third CU of the first type perform the step of exchanging at least one negotiation message containing a value for said parameter prior to said change of associations.

In the following, this solution will be referred to as the third embodiment of the present invention. If it is possible that a change of the third CU in the chain first-second-third CU occurs from a third CU of a first type to a third CU of a second type, wherein in the former case, the parameter is not required for said protocol, but in the latter case, said parameter is required for said protocol, it makes sense to negotiate said parameter between the protocol entities of the first CU and the protocol entities of the third CU of the first type, i.e. before the change of associations occurs. Parameter negotiation may be initiated by either the first of third CU by proposing a value for said parameter. The negotiated value for said parameter is then stored in the protocol entities of the first CU and the third CU of the first type, but is not used in the operation of said protocol. When the third CU of the first type in the chain first-second-third CU is changed to a third CU of a second type, said value for the parameter is handed from the third CU of the first type to the third CU of the second type, unless the third CU of the first type and the third CU of the second type have a common part, e.g. an interworking function for the case that the third CUs are MSCs of mobile networks operated according to different standards such as UMTS and GSM, wherein said common part maintains the association with the first CU and holds said value for the parameter during the change of the third CU in the chain first-second-third CU. Thus parameter re-negotiation between the first CU and the third CU of the second type after the change of associations is not necessary, because the required value for the parameter is already available in both protocol entities.

According to the third embodiment of the present invention, it is advantageous that in said exchange of at least one negotiation message, the protocol entities in the first CU or the third CU of the first type perform the following steps: checking whether it is possible that said data transmission between the first CU and the third CU of the second type is a multi-link data transmission that requires the definition of a re-sequencing timer as said parameter for said protocol, and checking whether a value for said re-sequencing timer is available as a basis for negotiation.

For example, when the first CU is a MS of a mobile radio system, the second CUs are BTSs and the third CUs are MSCs of a mobile network operated according to the UMTS standard (third CU of the first type) and GSM standard (third CU of the second type), parameter negotiation then only takes place if the future call in the GSM system is possibly a multi-link call, because otherwise the re-sequencing timer would not be required. As a basis for parameter negotiation, a value for the parameter as selected by the user of the MS or default values as stored in the UMTS-MSC or the MS may be used.

The object of the invention is further solved by a computer program product directly loadable into the internal memory of a digital computer, comprising software code portions for performing the steps as performed by the protocol entities of the first and third CUs when said product is run on a computer.

The object of the invention is further solved by a system for data transmission between first Communication Units (CUs) of said system and third CUs of said system via second CUs of said system, where the protocol that controls said data transmission is operated by protocol entities in the first and third CUs, where a first CU is always associated with a second CU at a time, where a second CU is always associated with a third CU at a time, and where there exist second CUs of at least a first and second type and/or third CUs of at least a first and second type that require different choices of at least one parameter for use in the operation of said protocol, which is characterised in that when an existing association of said first CU with a former second CU is changed to an association of said first CU with a new second CU, said protocol entities of the first CU and protocol entities of the third CU associated with the new second CU exchange at least one negotiation message containing a value for said parameter.

The object of the invention is further solved by a system for data transmission between first Communication Units (CUs) of said system and third CUs of said system via second CUs of said system, where the protocol that controls said data transmission is operated by protocol entities in the first and third CUs, where a first CU is always associated with a second CU at a time, where a second CU is always associated with a third CU at a time, and where there exist second CUs of at least a first and second type and/or third CUs of at least a first and second type that require different choices of at least one parameter for use in the operation of said protocol, which is characterised in that in the case that it is possible that an association of said first CU with a second CU that is associated with a third CU of a first type may be changed to an association of said first CU with a second CU that is associated with a third CU of a second type, said protocol entities of said first CU and said protocol entities of said third CU of the first type perform the step of exchanging at least one negotiation message containing a value for said parameter prior to said change of associations.

BRIEF DESCRIPTION OF THE DRAWINGS

These and other aspects of the invention will be apparent from and elucidated with reference to the embodiments described hereinafter. In the figures show.

DETAILED DESCRIPTION

Figure 1:
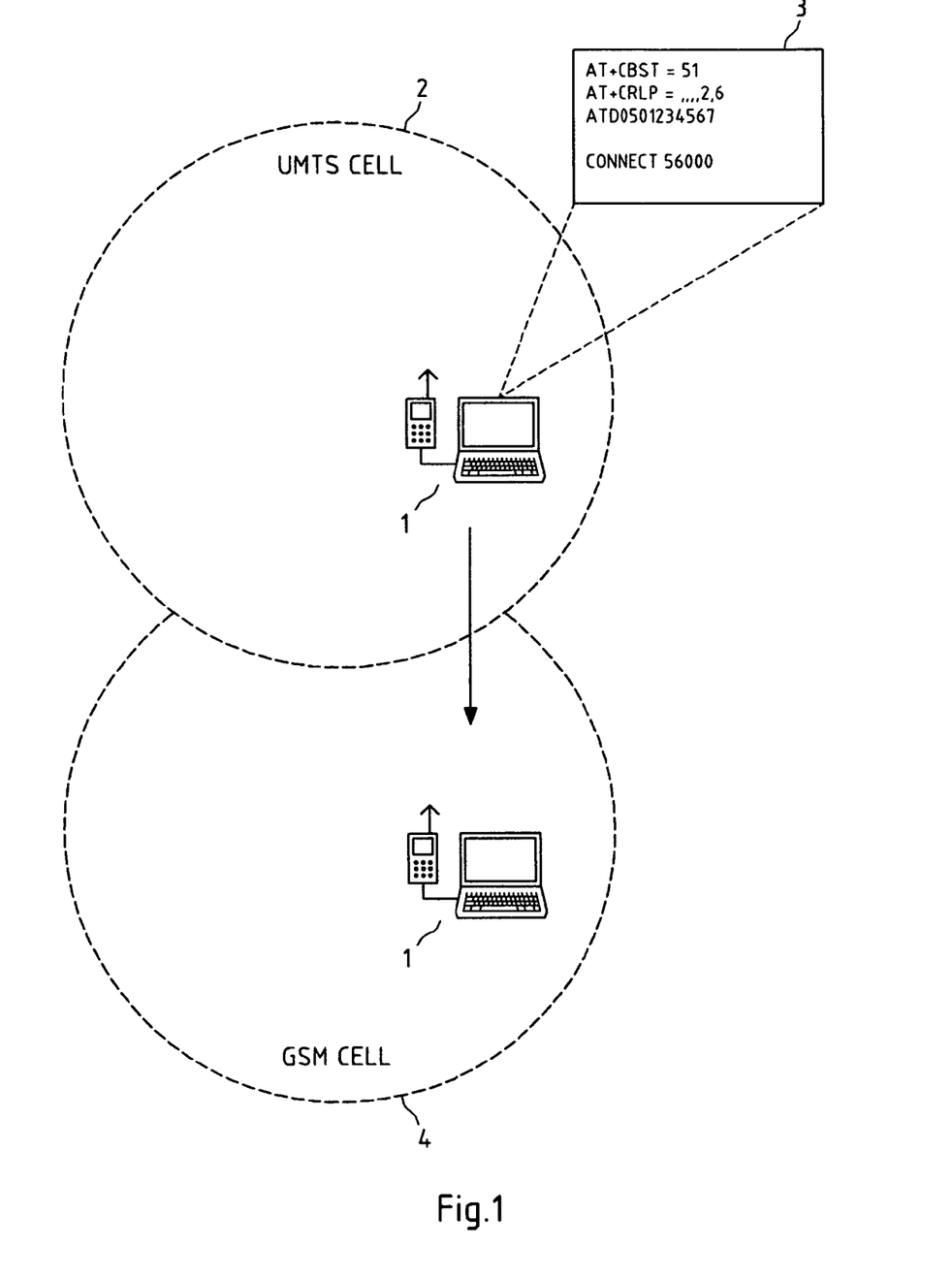
FIG. 1 an example scenario for the application of the first and third embodiment of the present invention, FIG. 2 a signalling chart according to the example of the first embodiment of the present invention according to FIG. 1, FIG. 3 an example scenario for the application of the second embodiment of the present invention, showing an Internet Protocol (IP) based connection or a satellite based connection.

FIG. 1 depicts an example for the application of the first and third embodiment of the present invention. A user 1 that represents a MS is located in the coverage area of a UMTS cell 2, which is associated with a UMTS-MSC, and creates an NT data call. The data call is configured via AT commands that are depicted enlarged on the display 3 of the users communication equipment. In particular, the user requests a Fixed Network User Rate (FNUR) of 56 kbps with AT command +CBST, changes the RLP parameter timer T4 to be 60 ms with AT command +CRLP and initiates the call with the command ATD<number>. Call set-up starts, and the RLP entity of the MS negotiates its connection parameters by sending an XID command frame to the peer RLP entity in the UMTS-MSC.

According to the first embodiment of the present invention, the timer T4 is not negotiated, because it is purposeless in UMTS and has therefore to be ignored. However, the timer T4 as selected by the user of the MS 1 is stored in the protocol entity of the MS 1. The RLP entity at the UMTS-MSC confirms the parameters proposed by sending an XID response frame back to the RLP entity of the MS. After a while, the user sees a CONNECT on the screen indicating that the connection is ready for data transfer and starts data transfer.

During the data transfer, the user 1 leaves the coverage area of the UMTS cell, and the NT data call is handed to a GSM cell 4 that is associated with a GSM-MSC.

In this particular case, the resulting call in GSM is a multi-slot call, so that RLP timer T4 is required. In a prior art system, both RLP entities of the MS and the GSM-MSC would start using default values for the timer T4. In contrast, according to the first embodiment of the present invention, parameter T4 is re-negotiated between MS and GSM-MSC upon entry in the GSM cell, so that the timer T4, which was set to 60 ms by the user during call set-up in the UMTS cell, is considered within the RLP of the GSM cell.

Figure 2:
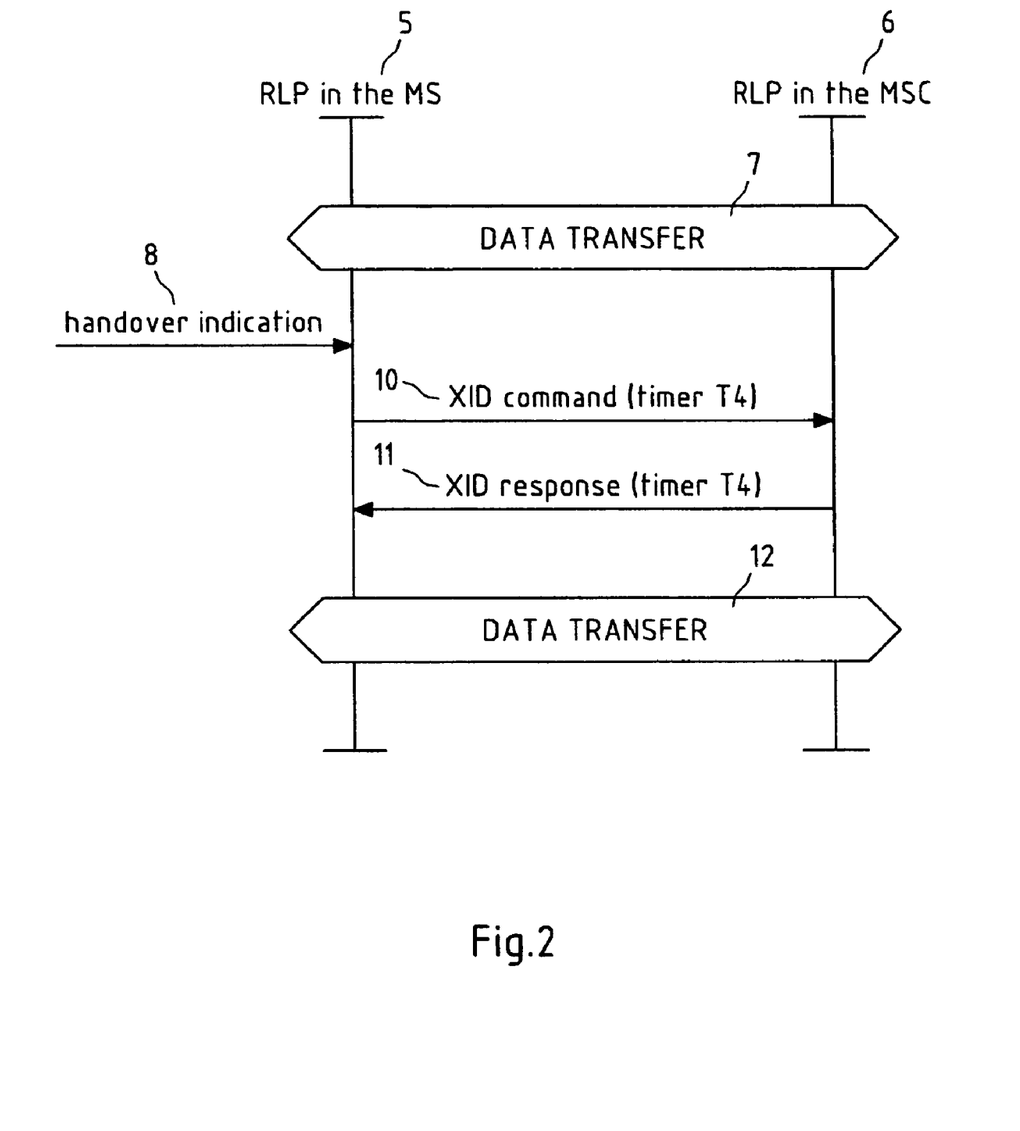

FIG. 2 depicts a corresponding signalling chart between the RLP entities 5 in the MS and the RLP entities 6 in the MSC for the case of a system handover between UMTS and GSM, as exemplarily introduced in FIG. 1. After call set-up in the UMTS cell, data transfer 7 is started between the RLP entities 5 and 6 based on the RLP protocol. The event of a handover of the NT data call from a UMTS-MSC to an GSM-MSC is indicated to the RLP entity 5 of the MS by means of an indication 8. The RLP entity 5 then transmits an XID command frame 10 with the value T4 as pre-selected by the user to its peer RLP entity 6 in the GSM-MSC, which accepts or further increases the proposed value of the timer T4 by transmitting an XID response message 11. Thus the timer T4 is re-negotiated upon entry in the GSM cell, and further data transfer 12 can start based on a multi-link transmission with re-sequencing timer T4=60 ms.

Figure 3:
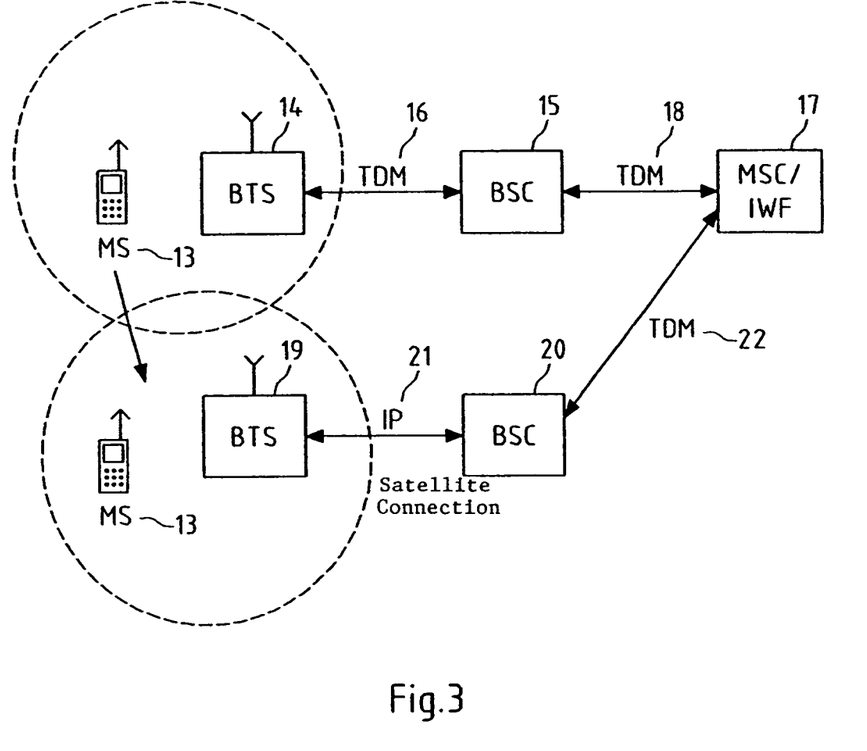

FIG. 3 depicts an example scenario for the application of the second embodiment of the present invention. A MS 13 is located in the coverage area of a first BTS 14 and sets up a NT multi-link GSM data call. BTS 14 is connected to a BSC via a TDM-based connection 16. The BSC 15 in turn is connected to a GSM-MSC 17 via a second TDM-based connection 18. The network between BTS 14 and GSM-MSC 17 thus is entirely TDM-based. The MS 13 then moves out of the coverage area of BTS 14 and moves into the coverage area of BTS 19, so that an intra-MSC handover occurs. BTS 19 is connected to a BSC 20 via an IP-based connection 21 or a satellite based connection, and the BSC 20 is connected to the same MSC 17 as BSC 15 via a TDM-based connection 22. The network between BTS 19 and GSM-MSC 17 thus is partially IP-based. Due to the IP-based connection 21, the delay and the delay variation of the frame/PDUs transmitted within the RLP protocol is significantly higher when MS 13 is associated with BTS 19 as compared to the case when MS 13 is associated with BTS 14. In prior art, the timers T1 and T4 are not automatically re-negotiated after such a handover, and default values for the timers T1 and T4, which are optimised for TDM-based connections between the BTS and the GSM-MSC, are adopted by the RLP entities in the MS and GSM-MSC. In contrast, according to the second embodiment of the present invention, suited values for the timers T1 and T4 are stored in the MSC and are automatically re-negotiated upon entry of the MS 13 into the cell which is operated by the partially IP-based network.

Figure 4:
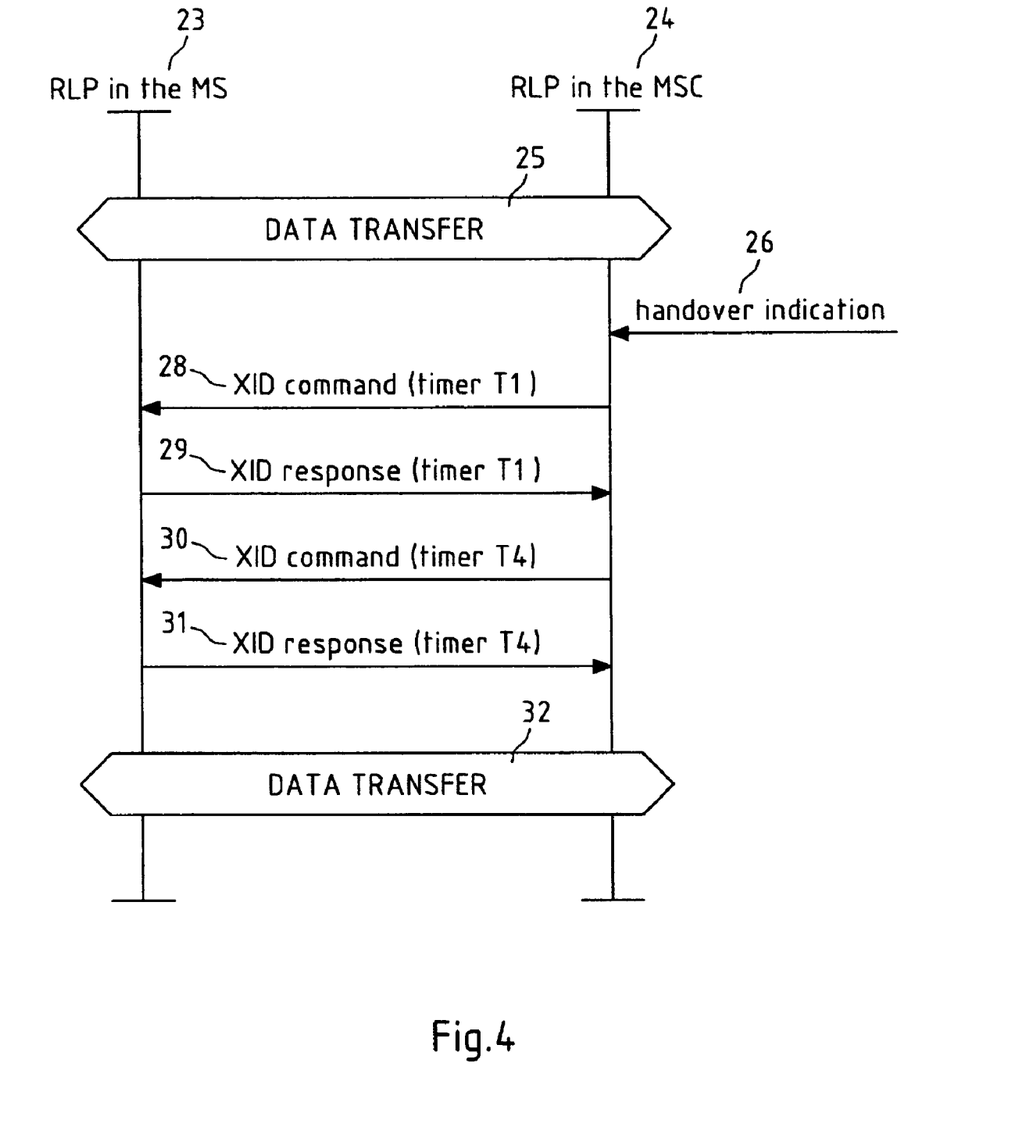
FIG. 4 a signalling chart according to the example of the second embodiment of the present invention according to FIG. 3, and FIG. 5 a signalling chart according to the example of the third embodiment of the present invention according to FIG. 1.

FIG. 4 depicts a corresponding signalling chart between the RLP entities 23 in the MS and the RLP entities 24 in the GSM-MSC for the case of a system handover between a lower-delay TDM-based network and a higher-delay partially IP-based network as introduced in FIG. 3. After call set-up in the lower-delay network, data transfer 25 is started between the RLP entities 23 and 24 based on the RLP protocol. The event of a handover of the NT data call from the lower-delay network with BTS 14 to a higher-delay network with BTS 19 is indicated to the RLP entity 24 of the GSM-MSC by means of an indication 26. The RLP entity 24 in the GSM-MSC then transmits and XID command frame 28 with the value T1 as stored in the GSM-MSC for the connection between GSM-MSC and associated BTS 19 to its peer RLP entity 23 in the MS, which accepts or further increases the proposed value of the acknowledgement timer T1 by transmitting an XID response message 29. The same re-negotiation takes place for the re-sequencing timer T4 via XID command 30 transmitted by the RLP entity 24 in the GSM-MSC and XID response 31 transmitted by the RLP entity 23 in the MS. Both parameters can be re-negotiated also with a single XID command/response pair. Thus both timers T1 and T4 are re-negotiated upon entry in the higher-delay network, and data transfer 32 in the higher-delay network becomes possible.

Figure 5:
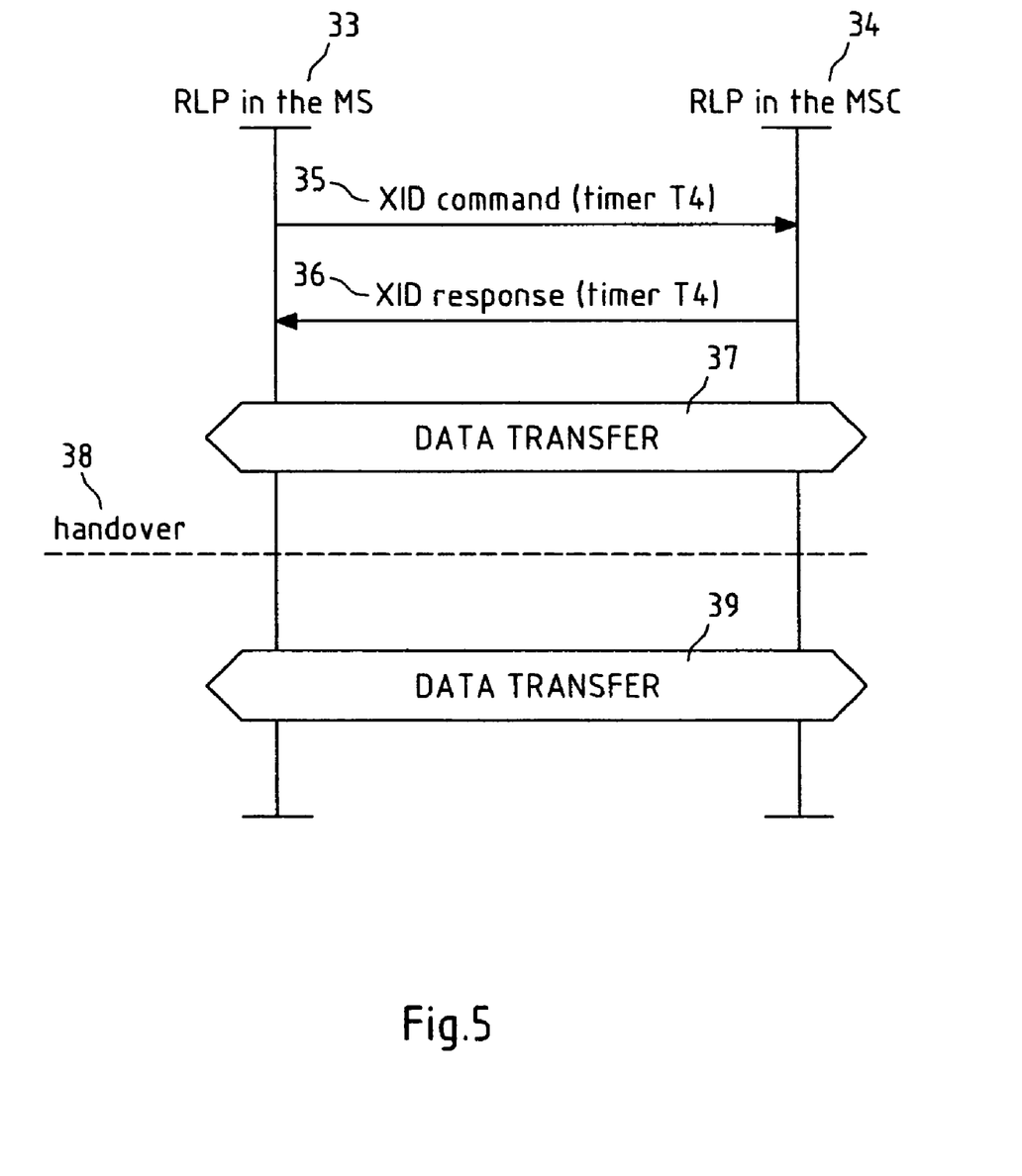

FIG. 5 depicts a signalling chart between the RLP entities 33 in the MS and the RLP entities 34 in the MSC for the case of a data call handover between UMTS and GSM (cf. the scenario of FIG. 1) and for the case that the third embodiment of the present invention is used to adapt protocol parameters to the handover prior to the actual handover. During call set-up in the UMTS cell 2, the parameter T4 as pre-selected by the user of the MS 1 is negotiated in view of a possible future handover to a GSM cell 4. To this aim, the MS RLP entity 33 transmits an XID command frame 35 with the value T4 as pre-selected by the user of MS 1 (T4=60 ms) to its peer UMTS-MSC RLP entity 34, which accepts or further increases the proposed value of the timer T4 by transmitting an XID response message 36. The negotiated value for the parameter T4 is then stored in the RLP entities of both MS 33 and UMTS-MSC 34, but is not used in the RLP protocol within the UMTS system. Then data transfer 37 is started between the RLP entities 33 and 34 based on the RLP protocol. After a handover 38 of the MS 1 from the UMTS cell 2 to the GSM cell 4, data transfer 39 between the MS RLP entity 33 and the GSM-MSC RLP entity 34 starts without parameter re-negotiation. However, due to the fact that the re-sequencing timer T4 is relevant for the RLP protocol in the GSM system, the value for T4 as available in the MS RLP entity 33 and in the GSM-MSC RLP entity 34 is used in the GSM RLP protocol. The value for T4 is available in both the UMTS-MSC and the GSM-MSC RLP entities despite the fact that a handover occurred from the UMTS-MSC to the GSM-MSC, because the same interworking function (IWF) with the RLP entity that has been reserved at the setup of the call will be used throughout the entire call. I.e., even after a handover, the same IWF is still used.

The invention has been described above by means of preferred embodiments. It should be noted that there are alternative ways and variations which are obvious to a skilled person in the art and can be implemented without deviating from the scope and spirit of the appended claims, e.g. the direction of the change of the parameter values in the negotiation may be upwards or downwards depending on the meaning of the parameter being negotiated.

What is claimed is:

1. A method for negotiation of at least one parameter for use in the operation of a protocol that controls data transmission between first communication units and third communication units via second communication units,
    said protocol operated by protocol entities in said first and third communication units,
    said method comprising:
    transmitting, in case that it is possible that an association of a first communication unit with a second communication unit that is associated with a third communication unit of a first type may be changed to an association of said first communication unit with a second communication unit that is associated with a third communication unit of a second type, wherein said third communication unit of said first and second type require different choices of said parameter,
    at least one negotiation message containing a value for said parameter from a protocol entity of said first communication unit to a protocol entity of said third communication unit of said first type or from a protocol entity of said third communication unit of said first type to a protocol entity of said first communication unit prior to said change of associations;
    wherein it is checked by a protocol entity in said first communication unit or in said third communication unit of said first type whether it is possible that said data transmission between said first communication unit and said third communication unit of said second type is a multi-link data transmission that requires a definition of a re-sequencing timer as said parameter for said protocol; and
    whether a value for said re-sequencing timer is available as a basis for negotiation.

2. A non-transitory computer readable memory in which a computer program is loaded, the computer program product comprising software code portions, said software code portions when run on a computer for performing the actions of claim 1.

3. The method according to claim 1,
    wherein said first communication unit is a mobile station of a mobile radio system,
    wherein said second communication units are base transceiver stations, and
    wherein said third communication units are mobile-services switching centres.

4. The method according to claim 3,
    wherein said third communication unit of said first type is a mobile-services switching centre of a mobile network operated according to the universal mobile telecommunications system standard or a derivative thereof, and
    wherein said third communication unit of said second type is a mobile-services switching centre of a mobile network operated according to the global system for mobile communications standard or a derivative thereof.

5. The method according to claim 3,
    wherein said protocol is a radio link protocol.

6. The method according to claim 3,
    wherein said protocol is a circuit switched, non-transparent single- and/or multi-link data protocol with automatic repeat request (ARQ).

7. The method according to claim 1,
    wherein said re-sequencing timer guards a difference between delays of frames transmitted on different physical links within a multi-link protocol.

8. The method according to claim 1,
    wherein said value for said re-sequencing timer that is available as a basis for negotiation is a user-defined value.

9. A system comprising first communication units, second communication units and third communication units,
    wherein the system is for data transmission between said first communication units of said system and said third communication units of said system via said second communication units of said system,
    wherein a protocol that controls said data transmission is operated by protocol entities in said first and third communication units,
    and wherein in case that it is possible that an association of a first communication unit with a second communication unit that is associated with a third communication unit of a first type may be changed to an association of said first communication unit with a second communication unit that is associated with a third communication unit of a second type, wherein said third communication unit of said first and second type require different choices of at least one parameter for use in the operation of said protocol, said protocol entities of said first communication unit and protocol entities of said third communication unit of said first type exchange at least one negotiation message containing a value for said parameter prior to said change of associations, and wherein in said exchange of said at least negotiation message, said protocol entities in said first communication unit or said third communication unit of said first type check whether it is possible that said data transmission between said first communication unit and said third communication unit of said second type is a multi-link data transmission that requires a definition of a re-sequencing timer as said parameter for said protocol, and whether a value for said re-sequencing timer is available as a basis for negotiation.

10. A first communication unit useable in a system for data transmission between first communication units of said system and third communication units of said system via second communication units of said system, wherein a protocol that controls said data transmission is operated by protocol entities in said first and third communication units, said first communication unit comprising:

a transmitter configured to transmit, in case that it is possible that an association of said first communication unit with a second communication unit that is associated with a third communication unit of a first type may be changed to an association of said first communication unit with a second communication unit that is associated with a third communication unit of a second type, wherein said third communication unit of said first and second type require different choices of at least one parameter for use in the operation of said protocol, at least one negotiation message, which contains a value for said parameter, from a protocol entity of said first communication unit to a protocol entity of said third communication unit of said first type prior to said change of associations; and wherein a protocol entity of said first communication unit is configured to check whether it is possible that said data transmission between said first communication unit and said third communication unit of said second type is a multi-link data transmission that requires a definition of a re-sequencing timer as said parameter for said protocol, and to check whether a value for said re-sequencing timer is available as a basis for negotiation.

11. A first communication unit according to claim 10, wherein said first communication unit is a mobile station of a mobile radio system, wherein said second communication units are base transceiver stations, and wherein said third communication units are mobile-services switching centres.

12. A first communication unit according to claim 11, wherein said third communication unit of said first type is a mobile-services switching centre of a mobile network operated according to the universal mobile telecommunications system standard or a derivative thereof, and wherein said third communication unit of said second type is a mobile-services switching centre of a mobile network operated according to the global system for mobile communications standard or a derivative thereof.

13. A first communication unit according to claim 10, wherein said protocol is a circuit switched, non-transparent single- and/or multi-link data protocol with an automatic repeat request (ARQ).

14. A first communication unit according to claim 13, wherein said protocol is a radio link protocol.

15. A first communication unit according to claim 10, wherein said re-sequencing timer guards a difference between delays of frames transmitted on different physical links within a multi-link protocol.

16. A first communication unit according to claim 10, wherein said value for said re-sequencing timer that is available as a basis for negotiation is a user-defined value.

17. A third communication unit useable in a system for data transmission between first communication units of said system and third communication units of said system via second communication units of said system, wherein a protocol that controls said data transmission is operated by protocol entities in said first and third communication units, wherein said third communication unit is a third communication unit of said a first type and comprises:

a transmitter configured to transmit, in case that it is possible that an association of a first communication unit with a second communication unit that is associated with said third communication unit may be changed to an association of said first communication unit with a second communication unit that is associated with a third communication unit of a second type, wherein said third communication unit and said third communication unit of said second type require different choices of at least one parameter for use in the operation of said protocol, at least one negotiation message, which contains a value for said parameter, from a protocol entity of said third communication unit to a protocol entity of said first communication unit prior to said change of associations;

wherein a protocol entity of said third communication unit is configured to check whether it is possible that said data transmission between said first communication unit and said third communication unit of said second type is a multi-link data transmission that requires a definition of a re-sequencing timer as said parameter for said protocol, and whether a value for said re-sequencing timer is available as a basis for negotiation.

18. A third communication unit according to claim 17, wherein said first communication unit is a mobile station of a mobile radio system, wherein said second communication units are base transceiver stations, and wherein said third communication unit is a mobile-services switching centre.

19. A third communication unit according to claim 18, wherein said third communication unit of said first type is a mobile-services switching centre of a mobile network operated according to the universal mobile telecommunications system standard or a derivative thereof, and wherein said third communication unit of said second type is a mobile-services switching centre of a mobile network operated according to the global system for mobile communications standard or a derivative thereof.

20. A third communication unit according to claim 17, wherein said protocol is a circuit switched, non-transparent single- and/or multi link data protocol with automatic repeat request (ARQ).

21. A third communication unit according to claim 20, wherein said protocol is a radio link protocol.

22. A third communication unit according to claim 17, wherein said value for said re-sequencing timer guards a difference between delays of frames transmitted on different physical links within a multi-link protocol.

23. The third communication unit according to claim 17, wherein said value for said re-sequencing timer that is available as a basis for negotiation is a user-defined value.

* * * * *